US007012881B2

(12) United States Patent
Kim

(10) Patent No.: US 7,012,881 B2
(45) Date of Patent: Mar. 14, 2006

(54) TIMING AND FREQUENCY OFFSET ESTIMATION SCHEME FOR OFDM SYSTEMS BY USING AN ANALYTIC TONE

(75) Inventor: Dong Kyu Kim, Pusan (KR)

(73) Assignee: Samsung Electronic Co., Ltd., Kyungki-Do (KR)

( * ) Notice: Subject to any disclaimer, the term of this patent is extended or adjusted under 35 U.S.C. 154(b) by 822 days.

(21) Appl. No.: 09/750,128

(22) Filed: Dec. 29, 2000

(65) Prior Publication Data
US 2002/0126618 A1   Sep. 12, 2002

(51) Int. Cl.
*H04J 11/00* (2006.01)
(52) U.S. Cl. ..................... 370/208; 375/344
(58) Field of Classification Search ............... 375/362, 375/366, 137, 139, 267, 260, 340, 341, 326, 375/344, 354, 355, 371, 259, 343, 350; 370/208, 370/210, 503, 347, 350, 491, 520, 203, 324, 370/330, 480; 455/63
See application file for complete search history.

(56) References Cited

U.S. PATENT DOCUMENTS

| 5,802,117 | A  | * | 9/1998  | Ghosh .......................... 375/344 |
| 5,991,289 | A  | * | 11/1999 | Huang et al. ................ 370/350 |
| 6,021,110 | A  | * | 2/2000  | McGibney ................... 370/208 |
| 6,058,101 | A  | * | 5/2000  | Huang et al. ................ 370/208 |
| 6,198,782 | B1 | * | 3/2001  | De Courville et al. ...... 375/341 |
| 6,285,654 | B1 | * | 9/2001  | Marchok et al. ............ 370/208 |
| 6,332,008 | B1 | * | 12/2001 | Giallorenzi et al. ........ 375/356 |
| 6,353,642 | B1 | * | 3/2002  | Asahara et al. .............. 375/344 |
| 6,363,084 | B1 | * | 3/2002  | Dejonghe .................... 370/480 |
| 6,373,861 | B1 | * | 4/2002  | Lee ............................. 370/503 |
| 6,393,073 | B1 | * | 5/2002  | Eilts ............................ 375/340 |
| 6,400,782 | B1 | * | 6/2002  | Tal et al. ..................... 375/350 |
| 6,418,158 | B1 | * | 7/2002  | Vishwanath et al. ........ 375/139 |
| 6,470,030 | B1 | * | 10/2002 | Park et al. .................... 370/480 |
| 6,487,252 | B1 | * | 11/2002 | Kleider et al. .............. 375/260 |
| 6,538,986 | B1 | * | 3/2003  | Isaksson et al. ............ 370/207 |
| 6,539,063 | B1 | * | 3/2003  | Peyla et al. ................. 375/267 |
| 6,614,864 | B1 | * | 9/2003  | Raphaeli et al. ............ 375/371 |
| 6,643,336 | B1 | * | 11/2003 | Hsieh et al. ................. 375/343 |
| 6,647,066 | B1 | * | 11/2003 | Szajnowski ................. 375/260 |
| 6,678,339 | B1 | * | 1/2004  | Lashkarian .................. 375/341 |
| 6,714,511 | B1 | * | 3/2004  | Sudo et al. .................. 370/208 |
| 6,765,969 | B1 | * | 7/2004  | Vook et al. .................. 375/259 |
| 6,807,241 | B1 | * | 10/2004 | Milbar et al. ............... 375/343 |
| 6,891,792 | B1 | * | 5/2005  | Cimini et al. ............... 370/206 |
| 2002/0065047 | A1 | * | 5/2002 | Moose ......................... 455/63 |

FOREIGN PATENT DOCUMENTS

WO   WO 00/77961 A1   12/2000

* cited by examiner

*Primary Examiner*—Bob A. Phunkulh
(74) *Attorney, Agent, or Firm*—Sughrue Mion, PLLC

(57) ABSTRACT

A timing and frequency offset estimation method for OFDM use an analytic tone in calculating timing offset estimation and a frequency offset estimation. An analytic tone includes a signal that contains only one subcarrier and has characteristics of a uniform magnitude and a uniform phase rotation. The estimation algorithm with an analytic tone is based correlation function. By changing the interval between two samples in correlation, the maximum estimation range for the frequency offset can be extended to ±N/2 subcarrier spacing, where N is the number of total subcarriers. Thus, the frequency synchronization scheme for OFDM systems has a wider range and a more simple complexity than traditional ones requiring separate fine and coarse synchronization.

40 Claims, 12 Drawing Sheets

TIMING AND FREQUENCY OFFSET ESTIMATION SCHEME FOR OFDM SYSTEMS BY USING AN ANALYTIC TONE

1. FIELD OF THE INVENTION

The present invention relates to a system and method for using an analytic tone to calculate the timing offset and frequency offset estimations in an orthogonal frequency division multiplexing (OFDM) system.

2. BACKGROUND OF THE INVENTION

A prior art multiplexing method known as OFDM (Orthogonal Frequency Division Multiplexing) has been applied extensively to high data rate digital transmission, such as digital audio/TV broadcasting and wireless LANs. Prior art OFDM receivers must work properly under varying conditions such as speed, temperature and humidity at a reasonable cost. Since demodulation is sensitive to frequency deviations, and because frequency deviations with respect to the suppressed carrier will result in a shift in the received spectrum, a need exists to control the frequency deviations. In the prior art OFDM systems, fast Fourier transform (FFT) techniques have been used to determine the frequency deviation.

Because the above-described prior art OFDM technique is very sensitive to varying conditions and synchronization errors, a prior art method for frequency synchronization of OFDM systems has been proposed that includes a two-step process consisting of coarse synchronization and fine synchronization. Coarse synchronization compensates for a frequency offset of an integer number of the subcarrier spacing, while fine synchronization corrects for a frequency offset smaller than one-half of the subcarrier spacing. The coarse synchronization and the fine synchronization must be performed separately for the prior art frequency synchronization, because the maximum estimation range of the fine synchronization is one-half of subcarrier spacing. Examples of prior art algorithms for coarse synchronization include GIB (Guard Interval Based) and PB (Pilots Based).

Coarse synchronization can be accomplished by comparing the position of the received spectral lines with the initial reference peak positions (i.e., expected positions). Coarse synchronization provides an accuracy of 0.5 of the frequency spacing of the data carriers. However, various leakage components (e.g., unwanted harmonics) are generated when the FFT window does not fit with an integer number of periods of the received signal. Consequently, fine synchronization is required to compensate for that problem, thus requiring both coarse and fine synchronization to solve the aforementioned problems.

In Timothy M. Schmidl and Donald C. Cox, "Robust Frequency and Timing Synchronization for OFDM," *IEEE Trans. on Communication*, Vol. 45, No. 12, pp.1613–1621, December 1997, the contents of which is incorporated herein by reference, Schmidl and Cox propose a prior art OFDM symbol for synchronization which repeats an identical pattern twice in a single OFDM symbol to increase the estimation range by one subcarrier spacing. Further, IEEE, *Supplement to Standard for Telecommunications and Information Exchange Between Systems-LAN/MAN Specific Requirements-Part 11: Wireless MAC and PHY Specifications: High Speed Physical Layer in the 5-GHz Band*, P802.11a/D7.0, July 1999, the contents of which is also incorporated herein by reference, defines the training OFDM symbol such that the repetition period is ¼ of the useful data interval, which increases the subcarrier spacing by a factor of two. However, a two-step synchronization process (i.e., coarse synchronization and fine synchronization) is still required.

The above-described two-step synchronization sequence requires a two-symbol training sequence, usually at the beginning of a frame. Each symbol is preceded by a guard interval for dealing with multipath effects, and each frame begins with a number of system symbols, including a zero symbol used for frame synchronization and to determine channel properties, and a training symbol for initial phase reference.

The symbol/frame timing is found by searching for a symbol, where the first half is identical to the second half in the time domain. Then, the carrier frequency offset is corrected according to the prior art coarse and fine frequency synchronization. As noted above, two symbols are required in the prior art system to estimation the frequency offset, and each symbol has two halves, with a portion of each training symbol copied from the first half to the second half, as illustrated in FIG. 8.

FIG. 8 illustrates a signal architecture for a wireless local area network (WLAN) according to the prior art OFDM system, according to the IEEE *Supplement*. A guard interval G1, G2, G3, G4, G5 is provided at the beginning of each training symbol R1, R2, R3, R4 an data symbol D1. The first training symbol R1 is used for signal detection and gain control, the second training symbol R2 is used for fine and coarse frequency synchronization, the third training symbol R3 is used for timing synchronization and the fourth training symbol R4 is used for channel estimation. Then, the data symbols D1 follow. For example, in each of the symbols, the guard interval is N/4, where N=64, such that the length of the guard symbol is 16. For the first and second training symbols, the pattern will repeat 10 times, in the manner as noted above and in Schmidl and Cox.

FIG. 9 illustrates a second prior art data structure according to T. Keller and L. Hanzo, "Orthogonal Frequency Division Multiplexing Synchronization Techniques for Wireless Local Area Networks," *Proc. Of PIMRC '96*, pp. 963–967, 1996, which is incorporated herein by reference. A null symbol N0 having no signal is provided as the first symbol, and is followed by a first training symbol R1 for timing and coarse and fine frequency synchronization, followed by a second training symbol R2 for channel estimation, and then the data symbols D1. A guard interval G is provided at the beginning of each of the data symbols and the second training symbol. However, the null symbol N0 and the first training R1 symbol do not have a guard interval G.

FIG. 10 illustrates a prior art OFDM system transmitter and receiver for the prior art data architectures illustrated in FIG. 8 and FIG. 9. Fine synchronization occurs before FFT at B, and coarse synchronization occurs after FFT at A. After fine synchronization occurs at B, the guard interval G is removed from each symbol by counting to detect each symbol's starting point, and the remaining symbols without the guard interval are subjected to a serial to parallel converter, and then the FFT. Next, the symbols go through coarse frequency synchronization at A, and are further processed to yield a serial data output at the receiver.

FIG. 11 illustrates the timing and fine frequency offset estimation of the prior art OFDM system at B of FIG. 10. After an analog-to-digital conversion (ADC) 51, a frequency offset for the fine synchronization is accomplished by a delayer 53 and conjugator 55 mixed with the output ADC signal at a mixer 57. A moving sum 59 is then calculated and output to the frequency offset calculator 61 and timing offset calculator 63. The maximum value of the timing offset is then detected, and the frequency offset is calculated in accordance with the timing offset estimation. However, additional coarse synchronization is required in the prior art OFDM system after the timing and frequency offset have been estimated in the fine synchronization, as illustrated in FIG. 10 at A.

The prior art OFDM system and method has various problems and disadvantages. For example, the estimation ranges are insufficient to overcome the need for both the coarse and fine synchronization steps. Further, the prior art OFDM system must process all of the subcarriers for timing and frequency synchronization. As noted above, both coarse and fine synchronization are required to synchronize the frequency. Further, the timing offset estimation depends on the frequency offset estimation.

The prior art OFDM system must also repeat the same pattern twice in one OFDM symbol to increase the estimation range by 1 subcarrier spacing. For example, ¼ of the useful data interval is required to increase subcarrier spacing by 2. However, these estimation ranges are also insufficient to overcome the need for both the coarse and fine synchronization steps. Increasing the interval has the additional disadvantage of decreasing sum length and accordingly, decreasing performance.

SUMMARY OF THE INVENTION

It is an object of the present invention to overcome the problems and disadvantages of the prior art.

It is another object of the present invention to eliminate the need for coarse synchronization in a frequency synchronization process, and simplify the mathematical calculations required to calculate the frequency offset estimation.

It is still another object of the present invention to calculate the timing offset estimation independently of the frequency offset estimation.

It is yet another object of the present invention to perform frequency synchronization using an analytic signal as a training symbol positioned in a single subcarrier of the overhead portion of a data packet.

To achieve the aforementioned objects, a system for estimating frequency offset in an orthogonal frequency-division multiplexing (OFDM) system is provided, comprising a sliding window correlation summing device that receives an input in accordance with a training symbol and generates a sliding window correlation sum, and a frequency offset estimator that is coupled to said sliding window correlation summing device and receives said sliding window correlation sum and calculates a frequency offset estimation in accordance with a timing offset estimation, wherein said training symbol comprises an analytic tone located in only one subchannel of said training symbol.

Another system for estimating frequency offset in an orthogonal frequency-division multiplexing (OFDM) system is provided, comprising a sliding window correlation summing device that receives an input in accordance with a symbol and generates a sliding window correlation sum, and a frequency offset estimator coupled to said sliding window correlation summing device and receiving said sliding window correlation sum and calculates a frequency offset estimation in accordance with a timing offset estimation. The frequency offset estimator comprises an analytic tone-phase compensation device that receives said sliding window correlation sum and performs a phase compensation operation to a generate a phase-compensated output, and a frequency offset estimation calculator that receives that said phase-compensation output and calculates said frequency offset estimation, wherein an analytic tone is used in a correlation function. The system also comprises a timing offset estimator that receives said input signal and generates said timing offset estimation independent of said frequency offset estimation, wherein an estimation range can be extended by adjusting a correlation interval between samples, said analytic tone has at least one of a uniform magnitude and a uniform phase rotation, and no coarse synchronization is required.

Additionally, a system for estimating frequency offset in an orthogonal frequency-division multiplexing (OFDM) system is provided, comprising a sliding window correlation summing device that receives an input in accordance with a training symbol and generates a sliding window correlation sum, and a frequency offset estimator that is coupled to said sliding window correlation summing device and receives said sliding window correlation sum to calculate a frequency offset estimation in accordance with a timing offset estimation, wherein an analytic tone is used in a correlation function.

Further, a method for frequency offset estimation is provided, comprising the steps of (a) generating an analytic tone located on only one subcarrier of a training symbol in accordance with an input, (b) generating a sliding window correlation sum in accordance with said analytic tone, and (c) calculating a frequency offset estimation of said sliding window correlation sum in accordance with a timing offset estimation, wherein a correlation interval is adjusted such that no coarse synchronization is required.

Also, a method for frequency offset estimation is provided, comprising the steps of (a) generating an analytic tone located on only one subcarrier of a training symbol in accordance with an input, and (b) generating a sliding window correlation sum in accordance with said analytic tone. Said step (b) comprises delaying said input in accordance with a frequency offset interval to generate a first delayed output, performing an operation on said first delayed output to generate a conjugated output, and mixing said conjugated output and said input signal to generate a mixed output.

Further, the method comprises calculating a frequency offset estimation of said sliding window correlation sum in accordance with a timing offset estimation, said calculating step comprising, (a) performing a phase compensation operation on said sliding window correlation sum to generate a phase-compensated output, (b) performing a first mathematical operation to generate a first calculated output, and (c) receiving said first calculated output and generating said frequency offset estimation. Additionally, the method comprises extending an estimation range by adjusting a correlation interval between samples, wherein a correlation interval is adjusted such that no coarse tuning is required.

BRIEF DESCRIPTION OF THE DRAWINGS

The accompanying drawings, which are included to provide a further understanding of preferred embodiments of the present invention and are incorporated in and constitute a part of this specification, illustrate embodiments of the invention and together with the description serve to explain the principles of the drawings.

DETAILED DESCRIPTION OF THE INVENTION

Reference will now be made in detail to the preferred embodiment of the present invention, examples of which are illustrated in the accompanying drawings. In the present invention, the terms are meant to have the definition provided in the specification, and are otherwise not limited by the specification.

The preferred embodiment of the present invention uses an analytic signal as the training symbol for frame synchronization of the OFDM systems and the timing and frequency offset estimation algorithms. The analytic signal is a complex function having only positive or negative frequencies. Because the analytic signal only uses one subcarrier, it is hereafter referred to as an analytic tone. The analytic tone is generated easily by using inverse fast Fourier transform (IFFT), and has characteristics of uniform magnitude and fixed phase rotation, and depends on the frequency index used. Therefore, the analytic signal is not affected by various other factors (e.g., nonlinearity of amplifiers). Further, by changing the correlation interval of the product, the maximum estimation range for frequency offset can be extended to N/2 in a single step. Thus, the prior art need for a two-step synchronization process is eliminated.

The preferred embodiment of the present invention applies the analytic tone to a training symbol for synchronization. Because the OFDM technique already uses IFFT/FFT, the analytic tone is easily generated. However, the present invention only uses one subcarrier for the analytic tone. Table 1 illustrates the inputs of IFFT with 11 subcarriers to generate it.

TABLE 1

Inputs of IFFT for generation of an analytic tone.

| Sub-carrier index, k | Input value, $X_k$ | | |
|---|---|---|---|
| | Case 1 | Case 2 | Case 3 |
| −5 | 0 + j0 | 0 + j0 | 0 + j0 |
| −4 | 0 + j0 | 0 + j0 | 0 + j0 |
| −3 | 0 + j0 | 0 + j0 | 0 + j0 |
| −2 | 0 + j0 | 0 + j0 | 0 + j0 |
| −1 | 0 + j0 | 0 + j0 | 0 + j0 |
| 0 | 0 + j0 | 0 + j0 | 0 + j0 |
| 1 | $\pm\sqrt{N_u}$ + j0 | 0 + j0 | 0 + j0 |
| 2 | 0 + j0 | $\pm\sqrt{N_u}$ + j0 | 0 + j0 |
| 3 | 0 + j0 | 0 + j0 | 0 + j0 |
| 4 | 0 + j0 | 0 + j0 | $\pm\sqrt{N_u}$ + j0 |
| 5 | 0 + j0 | 0 + j0 | 0 + j0 |

Case 1 in Table 1 uses the first subcarrier, which is modulated by $\sqrt{N_u}$+j0 or $-\sqrt{N_u}$+j0 for the analytic tone. Cases 2 and 3 respectively use the second and fourth subcarriers for the analytic tone. $N_u$ represents the number of the subcarrier used in the OFDM symbols other than the analytic tone among a total of N subcarriers. For example, 52 subcarriers are used among total of 64 subcarriers. The average power of each subcarrier is power-normalized to a value of 1, and the total power of one OFDM symbol becomes $N_u$. Thus, to make the power of the training symbol which is the analytic tone equal to the power of the other OFDM symbols, the single subcarrier used in the analytic tone is modulated by $\pm\sqrt{N_u}$+j0.

Figure 1A:
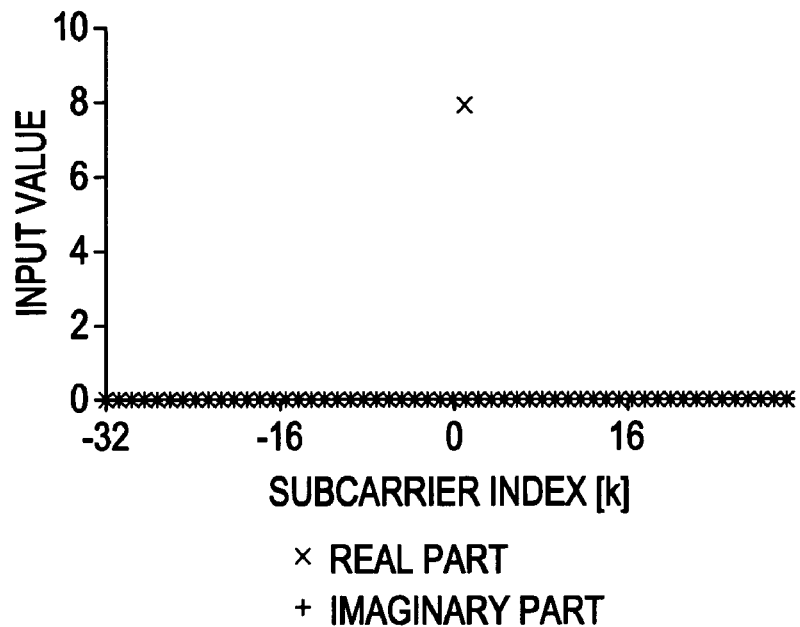
FIG. 1(*a*) illustrates a sample input value for complex and real numbers for an analytic tone according to the preferred embodiment of the present invention.
FIG. 1(b) illustrates a sample train of successive outputs and sample indices for the analytic tone according to the preferred embodiment of the present invention.
FIG. 1(c) illustrates a magnitude diagram of the analytic tone according to the preferred embodiment of the present invention.
FIG. 1(d) illustrates a phase diagram of the analytic tone according to the preferred embodiment of the present invention.

FIGS. 1(a)–1(d) illustrate characteristics of the analytic tone according to the preferred embodiment of the present invention. The training symbols carry out signal detection, automatic gain control, synchronization and channel estimation. FIG. 1(a) shows an example of the input complex value for the analytic tone of the preferred embodiment of the present invention. The symbols of ".times." and "+" in FIG. 1(a) represent respective real and imaginary parts of each complex IFFT input.

Figure 1B:
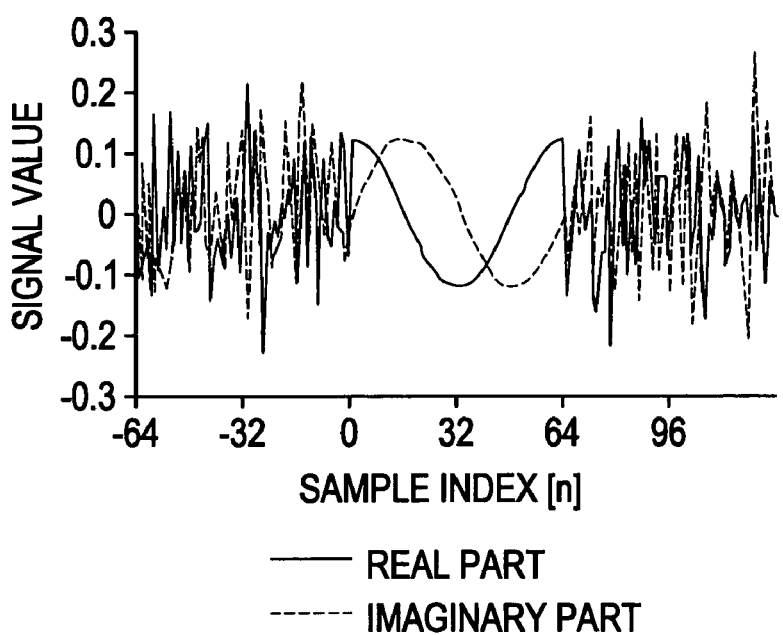

FIG. 1(b) illustrates the sample train of successive three IFFT outputs that represent 3 training symbols. The sample indexes of the analytic tone are from 0 to 63, and the other samples represent typical OFDM symbols not having the analytic tone. In FIG. 1(b), the solid line and the dashed line represent the respective real and imaginary parts of each sample based on the IFFT output.

Figure 1C:
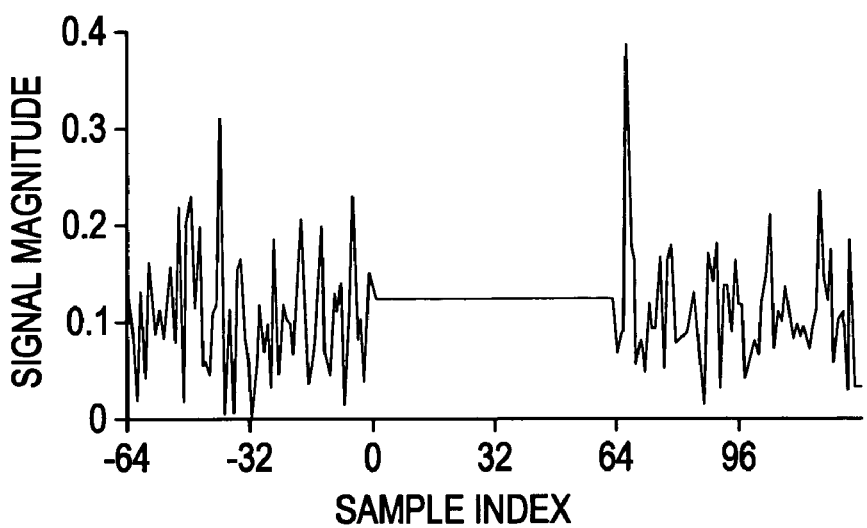
Figure 1D:
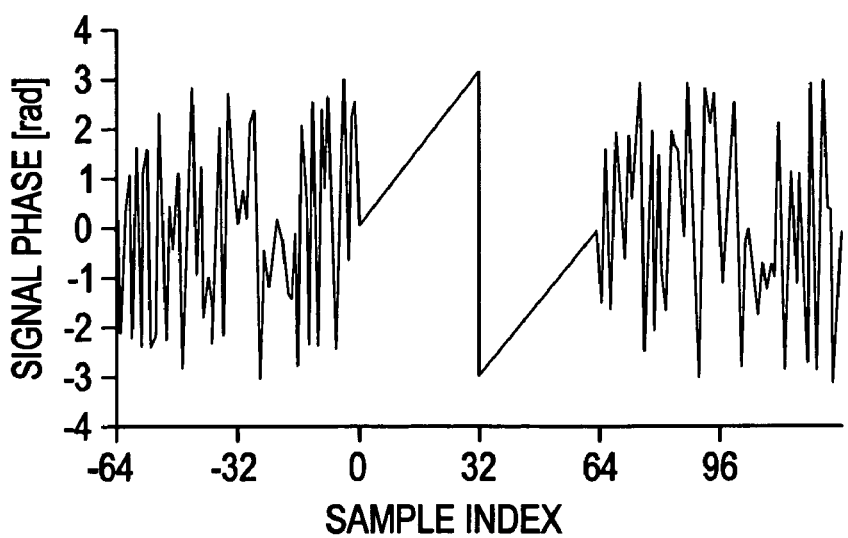

FIGS. 1(c) and 1(d) respectively illustrate the magnitude and the phase diagram of the training symbols of FIG. 1(b). FIG. 1(c) illustrates that the analytic tone has a uniform magnitude, A, and FIG. 1(d) illustrates that the analytic tone has a fixed phase rotation between the adjacent samples, $\phi_b$. The magnitude depends of the training symbols depends on the IFFT input, and the phase rotation depends on the subcarrier index of a tone. Equation (1) calculates the phase rotation between the adjacent samples in the analytic tone:

$$\phi_b = \frac{2\pi b}{N}, \quad (1)$$

where b is the frequency index of the tone used. For example, if b is 1 and N is 64 as illustrated in FIG. 1, $\phi_b$ becomes π/32 rad.

Additionally, the complex product with two transmitted samples which the interval between the two samples is a samples, represented by Equation (2):

$$R_{n,a}^{(x)} = x_n^* \cdot x_{n+a}, \qquad (2)$$

where $x_n$ is the $n^{th}$ sample of transmited signal and * is the conjugate complex value. For example, if two samples are in the analytic tone, the result of product can be expressed by Equation (3):

$$R_{n,a}^{(x)} = A^2 \cdot e^{ja\phi_b} = R_a^{(x)}. \qquad (3)$$

Equation (3) shows that the result of the product is independent of the sample index, n.

For the $n^{th}$ received sample, $z_n$, having a timing offset, $\theta$ [samples] and a normalized frequency offset, $\epsilon$, Equation (4) shows that:

$$z_n = x_{n-\theta} \cdot e^{j2\pi\epsilon n/N}, \qquad (4)$$

where the normalized frequency offset is the ratio of the frequency offset to the subcarrier spacing given by Equation (5):

$$\varepsilon = \frac{\Delta f}{f_{sub}}. \qquad (5)$$

Thus, the complex product with two received samples of which the interval is a samples is represented by Equation (6):

$$R_{n,a}^{(z)} = R_{n-\theta,a}^{(x)} \cdot e^{j2\pi\epsilon a/N}. \qquad (6)$$

Similarly to Equation (3), if two samples are in the analytic tone, the result of product can be expressed by Equation (7):

$$R_{n,a}^{(z)} = R_a^{(x)} \cdot e^{j2\pi\epsilon a/N} = A^2 \cdot e^{ja\phi_b} \cdot e^{j2\pi\epsilon a/N}. \qquad (7)$$

Because the receiver already has the information about the magnitude A and the compensation of phase rotation $e^{ja\phi_b}$, it can estimate the timing offset and the frequency offset in a single step using this characteristic.

The preferred embodiment of the present invention includes an algorithm that uses the above-described analytic tone to calculate the timing offset estimation and the frequency offset estimation. The method for calculating the timing offset estimation using the power (or magnitude) of the sum of Equation (7) is given by Equation (8)

$$\hat{\theta} = \underset{n}{\text{MAX}} \left| \sum_{i=0}^{N+G-a-1} R_{n+i,a}^{(z)} \right|^2 \text{ or } \underset{n}{\text{MAX}} \left| \sum_{i=0}^{N+G-a-1} R_{n+i,a}^{(z)} \right|, \qquad (8)$$

where G is the length of the guard interval and ^ means that the function is an estimation. Because the algorithm uses the exponential power, it is not affected by frequency offset. Further, increasing the value of a decreases the length of the sum.

The algorithm for calculating the frequency offset estimation uses the phase of the sum of Equation (7), as shown in Equation (9):

$$\hat{\varepsilon} = \frac{N}{2\pi a} \times \tan^{-1}\left\{ e^{-ja\phi_b} \cdot \sum_{i=0}^{N-a-1} R_{\hat{\theta}+c+i,a}^{(z)} \right\}. \qquad (9)$$

Before estimating the frequency offset, the timing offset $\hat{\theta}$ and compensation of phase rotation, $e^{ja\phi_b}$ are required. Further, c is an integer value less than the length of the guard interval G. The effect of the ISI(Inter-Symbol Interference) for estimation of the frequency offset is minimized by using an useful data interval that is not identical to the guard interval.

The estimation range depends on the interval a between a pair of signals. For example, when a is N/2 samples, which is about one-half of the useful data interval, the maximum estimation range equals ±1 subcarrier spacing, and when a is 1 sample, the maximum estimation range equals ±N/2 subcarrier spacing according to Equation (10):

$$|\hat{\varepsilon}| \leq \frac{N}{2a}. \qquad (10)$$

The interval a between the pair for the timing offset and the frequency offset estimation may have different values a1, a2 instead of a substantially same interval, a.

Figure 2:
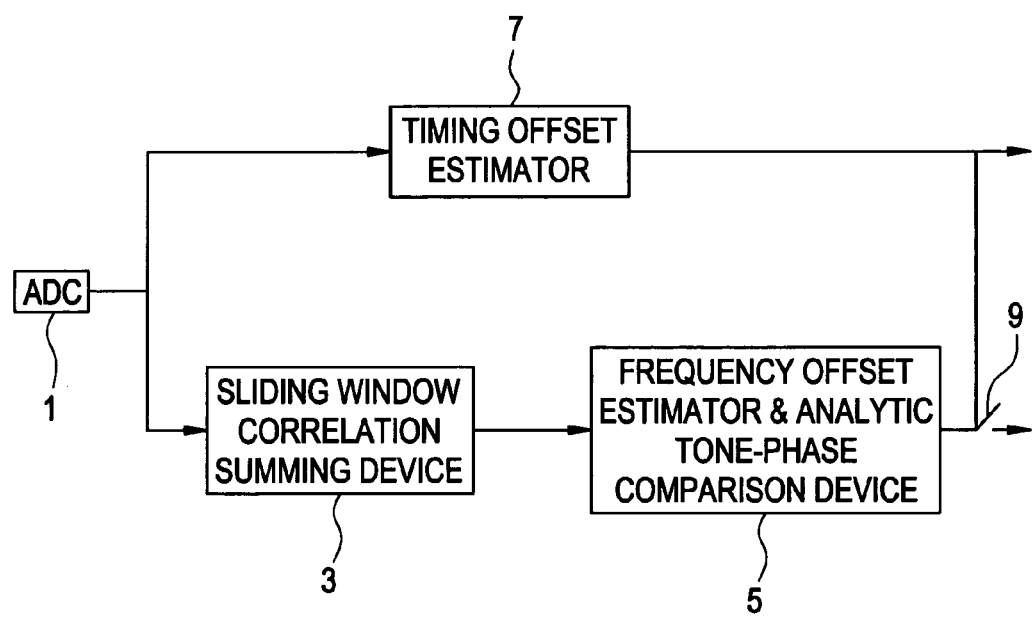
FIG. 2 illustrates a block diagram of an apparatus for calculating a timing offset estimation and a frequency offset estimation according to the preferred embodiment of the present invention.

FIG. 2 illustrates an apparatus for calculating the frequency offset estimation according to a first preferred embodiment of the present invention. An analog-to-digital converter (ADC) 1 receives an input signal and converts the input signal from an analog signal to a digital signal. A sliding window correlation summing device 3 receives a signal from the ADC 1, and generates an output received by a frequency offset estimator/analytic tone-phase compensation device 5, which calculates the frequency offset estimation $\hat{\epsilon}$ in accordance with the analytic tone. A timing offset estimator 7 also receives the signal from the ADC and calculates the timing offset estimation $\hat{\theta}$ independently of the calculation of the frequency offset estimation $\hat{\epsilon}$ by the frequency offset estimator 5. The timing offset estimation $\hat{\theta}$ is received at a switch 9, such that the frequency offset estimation $\hat{\epsilon}$ is calculated in a single step using the timing offset estimation $\hat{\theta}$.

Figure 3:
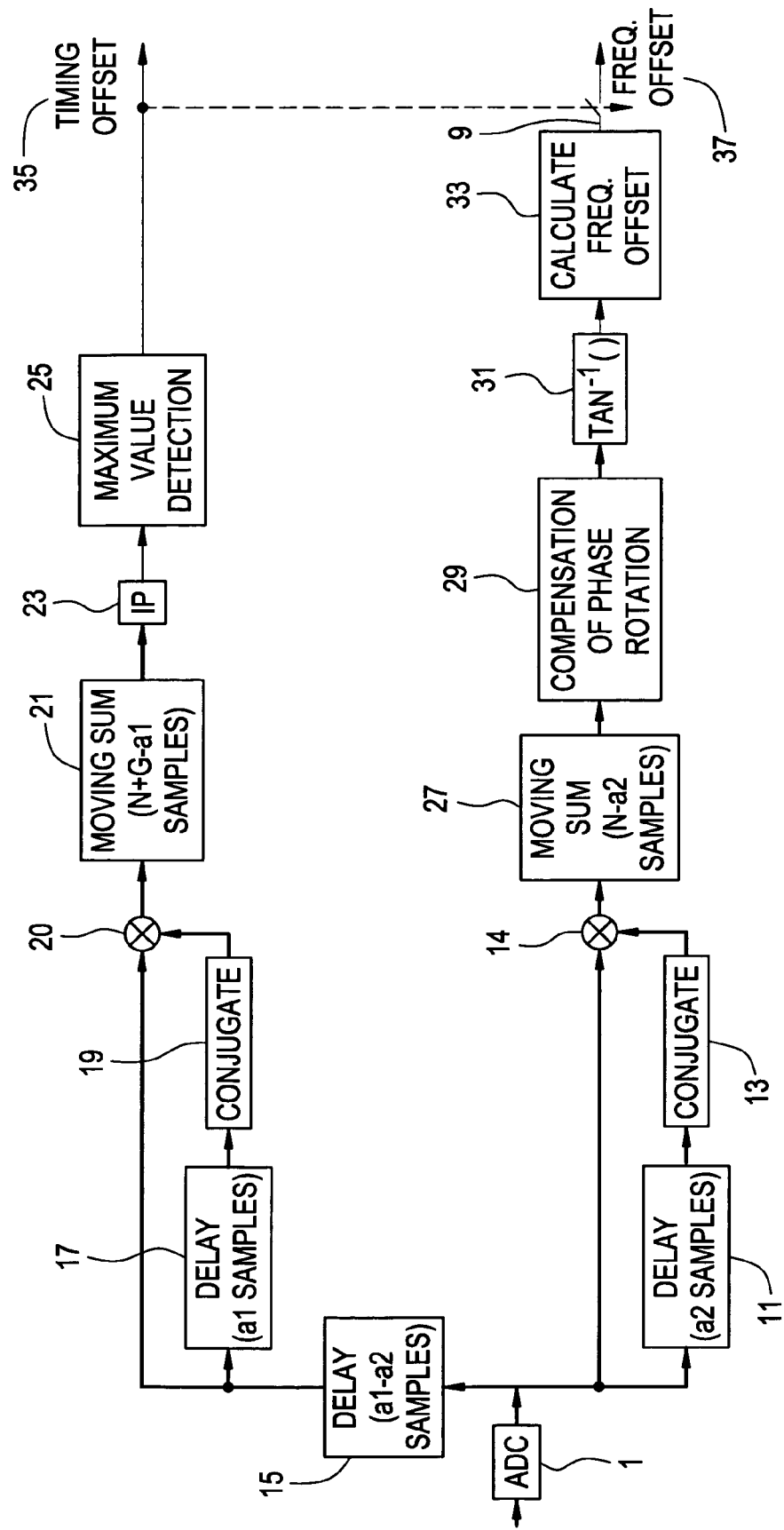
FIG. 3 illustrates a detailed diagram of the apparatus for calculating the timing offset estimation and the frequency offset estimation according to the preferred embodiment of the present invention.

FIG. 3 illustrates a more detailed diagram of the apparatus for calculating the frequency offset estimation $\hat{\epsilon}$ according to the preferred embodiment of the present invention. The respective intervals for the timing and frequency offset estimation are $a_1$ and $a_2$.

The sliding window correlation summing device 3 of FIG. 2 is illustrated in FIG. 3 as a delayer 11 and a conjugator 13 coupled to each other in series, and in parallel between an output of the ADC 1 and a mixer 14. The mixer 14 sums the real number output of the ADC 1 with the delayed, conjugated (i.e., complex) output of the ADC 1 to generate a sliding window correlation. The frequency offset estimation $\hat{\epsilon}$ interval discussed above is applied. Further, a moving sum device 27 calculates a moving sum for (N–a2) samples.

The frequency offset estimator/analytic tone-phase compensation device 5 includes an analytic tone-phase compensator 29 coupled to an output of the moving sum device 27. The analytic tone-phase compensator 29 receives the moving sum and provides phase compensation. The frequency offset estimation calculator 33 includes a mathematical operator 31 coupled to an output of the analytic tone-phase compensator 29 that generates a mathematical output that corresponds to $$\tan^{-1}\left\{ e^{-ja\phi_b} \cdot \sum_{i=0}^{N-a-1} R_{\hat{\theta}+c+i,a}^{(z)} \right\},$$

and is coupled to a frequency offset calculator 33, which calculates the frequency offset estimation $\hat{\epsilon}$ according to Equation (9), in accordance with the timing offset estimation $\hat{\theta}$ received from the timing offset estimator 7.

As also illustrated in FIG. 3, the timing offset estimator 7 includes a first delayer 15 that delays by a difference (a1–a2) samples, and sends an output to a second delayer 17, which delays a1 samples in accordance with the timing offset estimation interval, and a mixer 20. The delayer 17 and a conjugator 19 are coupled to one another in series, and are coupled in parallel between the first delayer 15 and the mixer 20 that receives the output of the first delayer 15 and the conjugator 19.

An output of the mixer 20 is received in a moving sum device 21, which calculates a moving sum for (N+G−a1) samples, and sends an output to a mathematical operator 23, which calculates an output based on Equation (8). An output of the mathematical calculator is received in a maximum value detector 25 that detects the maximum value generate a timing offset estimation $\hat{\theta}$. The maximum value detector 25 also generates an output to a switch 9, such that the frequency offset estimation $\hat{\epsilon}$ is calculated in a single step and in accordance with the timing offset estimation $\hat{\theta}$.

Figure 4:
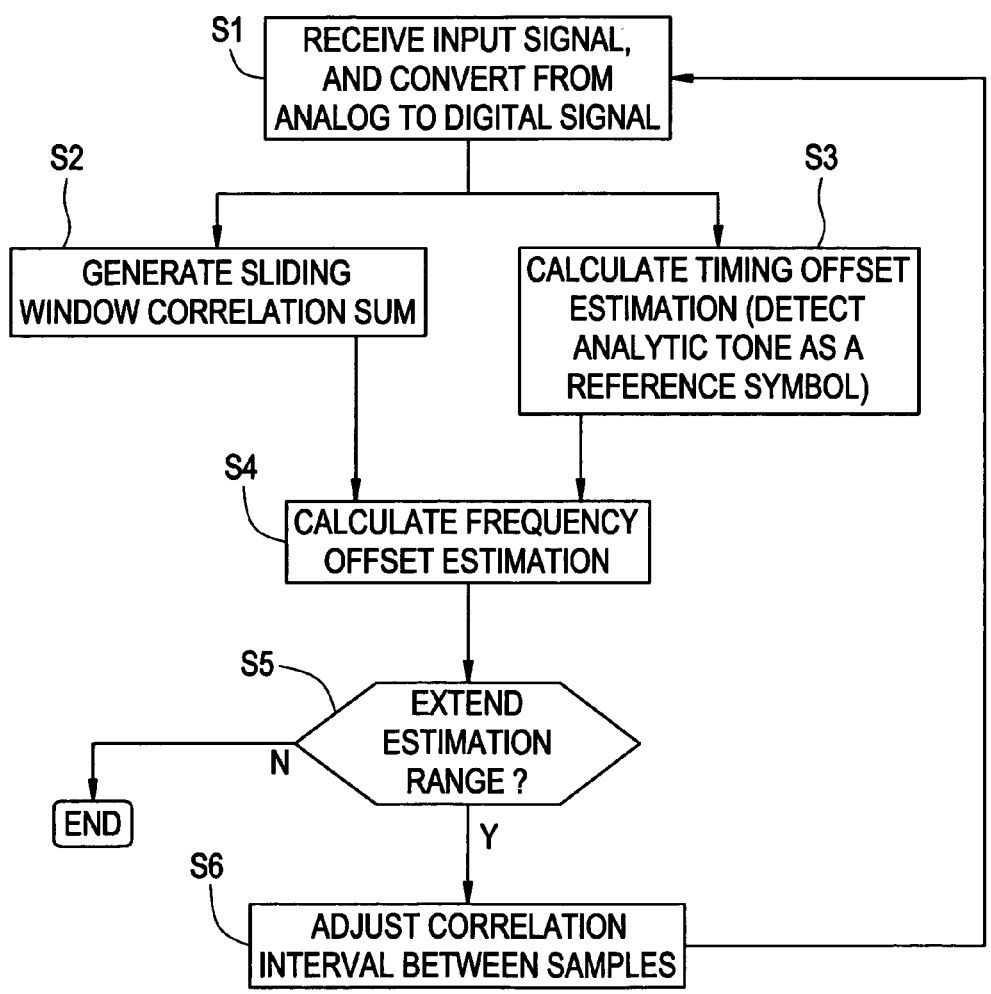
FIG. 4 illustrates a method of calculating the timing offset estimation and the frequency offset estimation according to the preferred embodiment of the present invention.

FIG. 4 illustrates a method of calculating the frequency offset estimation $\hat{\epsilon}$ in a single step according to the preferred embodiment of the present invention illustrated in FIGS. 2 and 3. In a first step S1, an input signal is received in the ADC 1, and a digitized output is generated. In simultaneous second and third steps S2, S3, the sliding window correlation sum and the timing offset estimation $\hat{\theta}$ are calculated. For example, the calculation of the timing offset estimation $\hat{\theta}$ may require delaying by an interval of (a1−a2), followed by delaying and conjugating the (a1) samples such that the first and second delayed, conjugated samples are received at the mixer 20. A moving sum is then calculated, and a mathematical operation performed in accordance with Equation (8), such that the maximum value is detected and outputted for calculation of the frequency offset estimation $\hat{\epsilon}$.

Further, the calculation of the sliding window correlation sum in step S2 may require delaying and conjugating of (a2) samples, such that the mixer 14 receives the delayed, conjugated samples and an output of the ADC 1. After being processed by the mixer 14, a moving sum is calculated for (N−a2) samples.

In a fourth step S4, the frequency offset estimation $\hat{\epsilon}$ is calculated in accordance with the outputs of the second and third steps S2, S3, respectively. In the preferred embodiment of the present invention, calculation of the frequency offset estimation $\hat{\epsilon}$ may involve phase rotation compensation, and performing a mathematical operation in accordance with Equation (9), such the frequency offset estimation $\hat{\epsilon}$ is calculated in accordance with the timing offset estimation $\hat{\theta}$, as described above.

In a fifth step S5, a determination is made as to whether the estimation range is to be extended. If the estimation range is to be extended, the correlation interval between samples is adjusted in a sixth step S6, and the adjusted correlation interval is then used to calculate the next frequency offset estimation $\hat{\epsilon}$ and timing offset estimation $\hat{\theta}$. If the estimation range is not extended, then the next frequency offset estimation $\hat{\epsilon}$ and timing offset estimation $\hat{\theta}$ are calculated, and the method returns to the first step S1.

FIGS. 5(a)–5(c) and 6(a)–6(e) respectively illustrate simulation results for frequency offset estimation $\hat{\epsilon}$ and timing offset estimation $\hat{\theta}$ for the preferred embodiment of the present invention. The channel is AWGN channel, all non-analytic tone OFDM symbols use 52 of the 64 subcarriers, and that the analytic tone uses the second subcarrier, which is modulated by $\sqrt{52}+j0$, as shown above in case 2 of Table 1. The phase difference between the adjacent samples is π/16 [rad], and the length of the guard interval G is 16 samples, which is ¼ of the useful data interval in OFDM symbol.

Figure 5A:
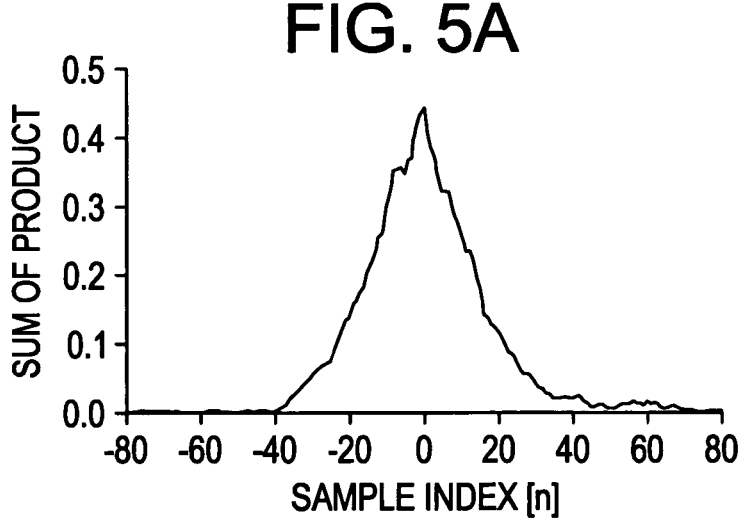
FIGS. 5(a)–5(c) illustrate graphical representations of simulation results for the performance of timing offset estimation according to the preferred embodiment of the present invention.
Figure 5B:
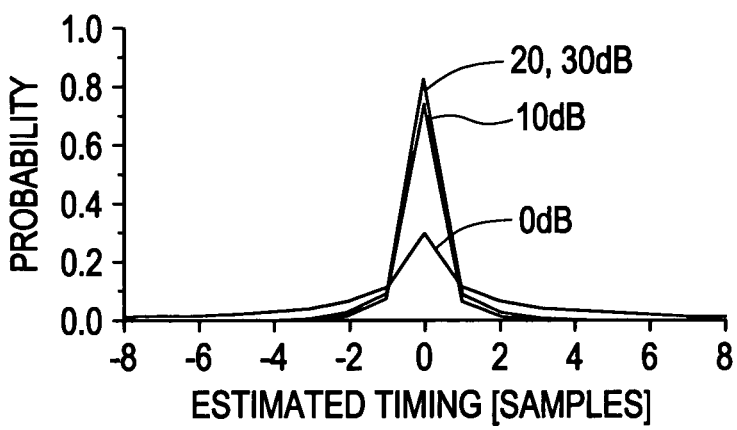

FIG. 5(a) shows the correlation result for a, equal to 32 samples and a signal-to-noise ratio (SNR) of 10 dB. FIG. 5(b) shows the probability distribution of the estimated timing for $a_1$ equal to 32 samples. For SNR values of 0, 10, 20 and 30 dB, the range for which the concentrated probability is more than 99%, includes 25, 3, 2 and 2 samples respectively. Further, if the SNR is greater than 20 dB, the estimation performance improves slightly.

Figure 5C:
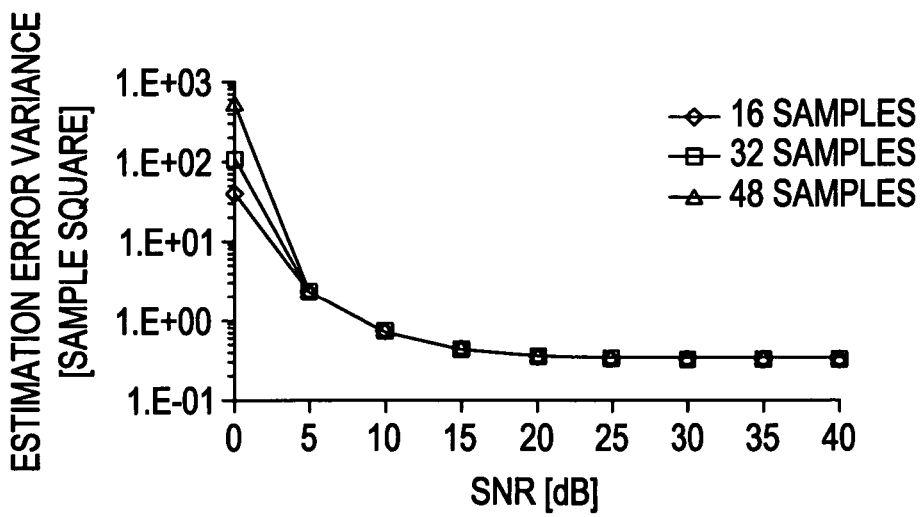

FIG. 5(c) shows the estimation error variance vs. SNR for three intervals. If the interval is increased in the low SNR range, the length of sum is decreased, and the performance of the estimation is degraded. However, in SNRs greater than 5 dB, the difference in the performance is substantially insignificant.

Figure 6A:
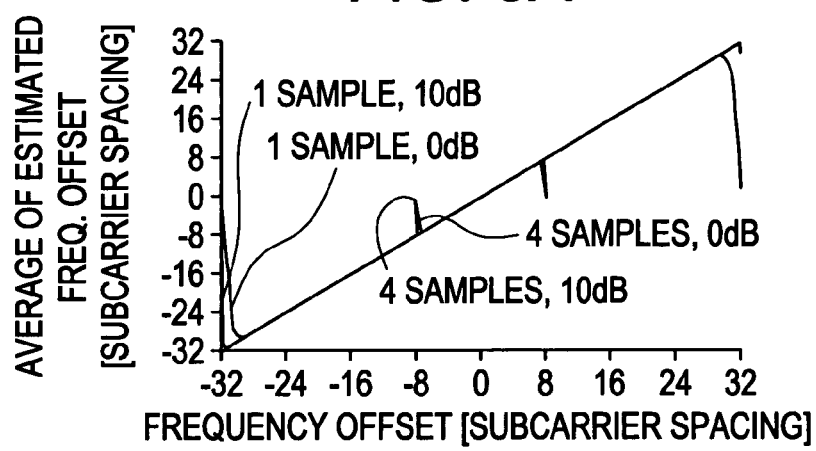
FIGS. 6(a)–6(e) illustrate graphical representations of simulation results for the performance of frequency offset estimation according to the preferred embodiment of the present invention.
Figure 6B:
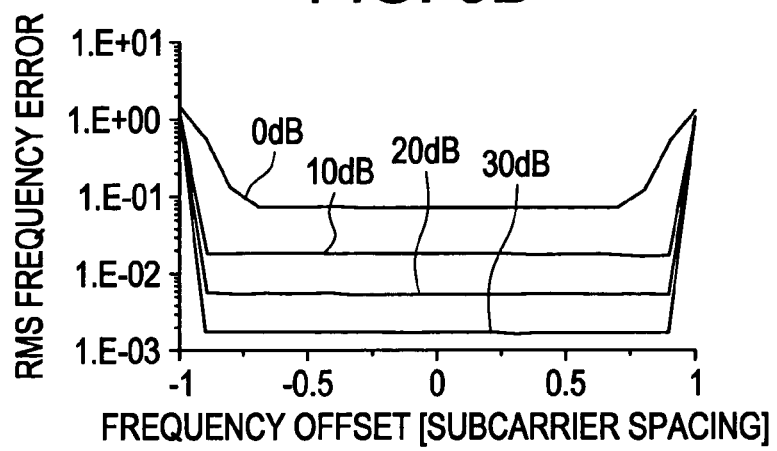
Figure 6C:
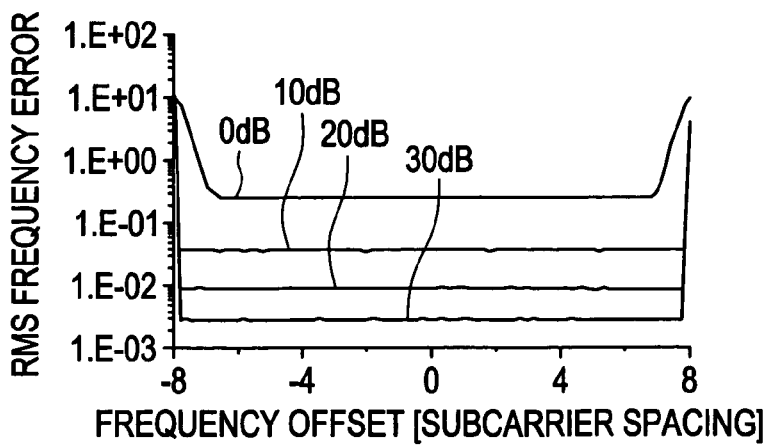
Figure 6D:
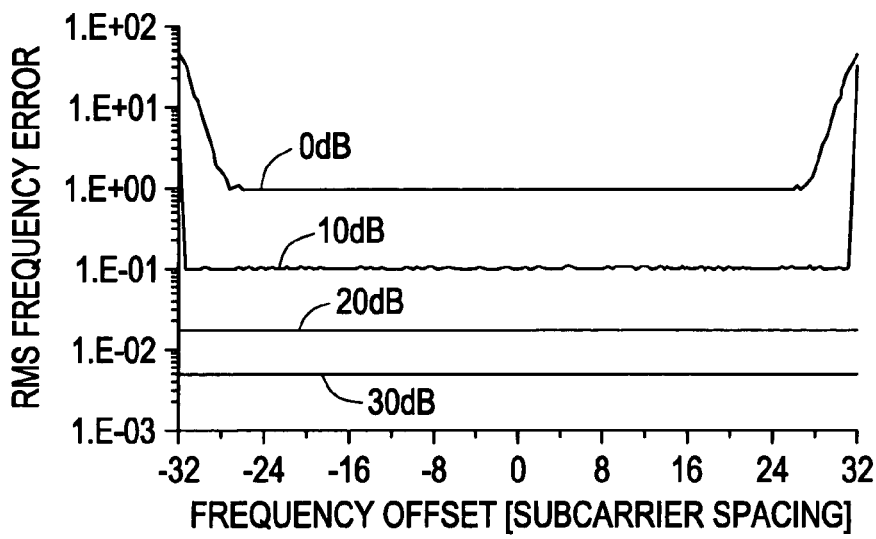
Figure 6E:
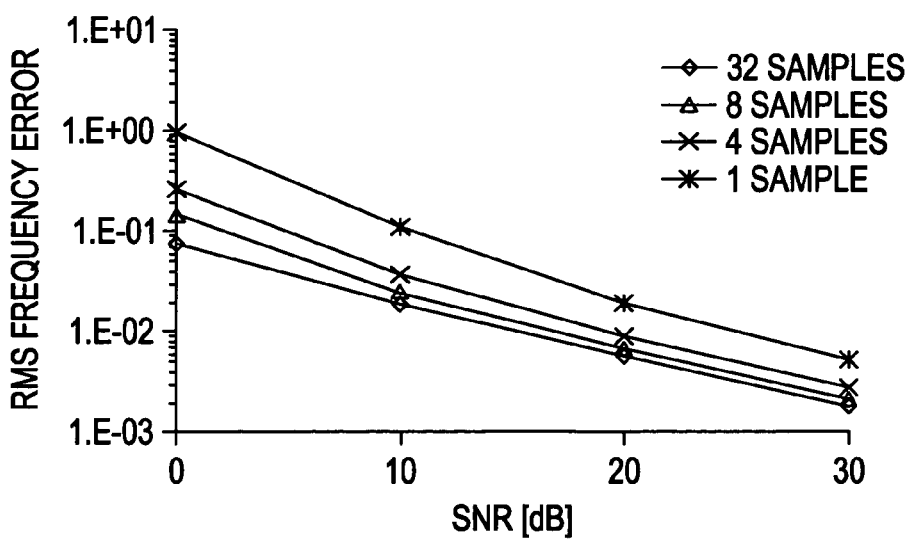

FIG. 6(a) shows the characteristic curve of the frequency estimation for the interval of 1 sample and 4 samples, respectively, at SNRs of 0 and 10 dB. The estimation range changes by a length of the interval as shown in Equation (10). For example, when $a_2$ is 1 sample, the maximum estimation range becomes ±32 subcarrier spacing. FIG. 6(b), (c) and (d) illustrate RMS frequency error vs. frequency offset estimation $\hat{\epsilon}$ for intervals of 32, 4 and 1 samples. When the interval length decreases, the estimation range increases. However, the RMS error increases due to phase resolution. FIG. 6(e) shows RMS frequency error vs. SNR.

Figure 7A:
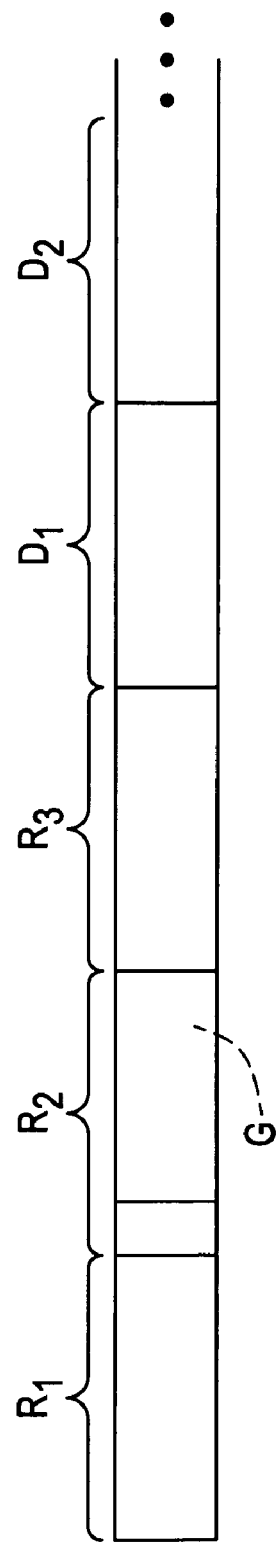
FIGS. 7(a) and 7(b) illustrate data structures according to the preferred embodiment of the present invention.
Figure 7B:
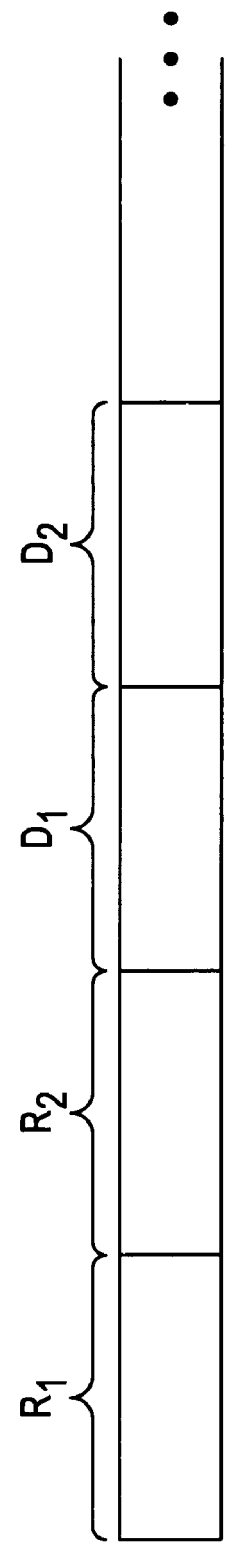
Figure 8:
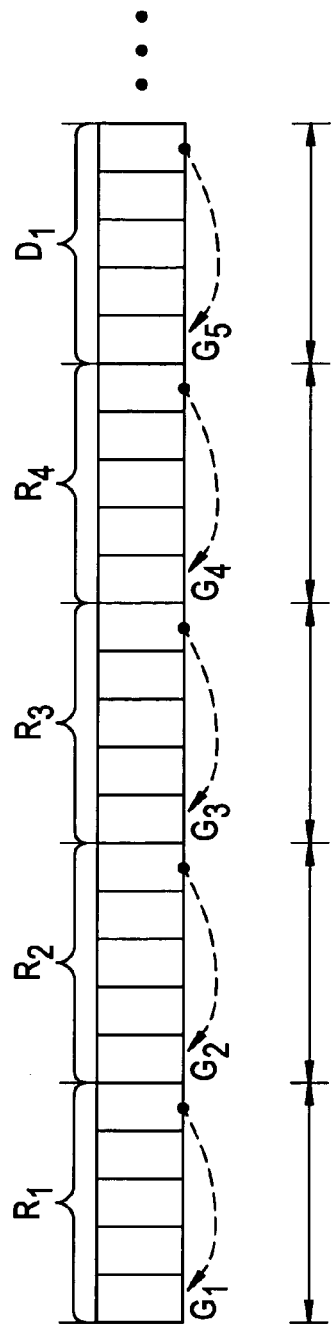
FIG. 8 illustrates a first data structure according to the prior art.
Figure 9:
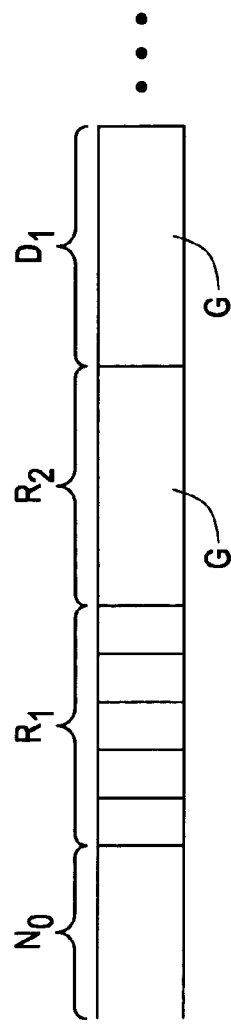
FIG. 9 illustrates a second data structure according to the prior art.
Figure 10:
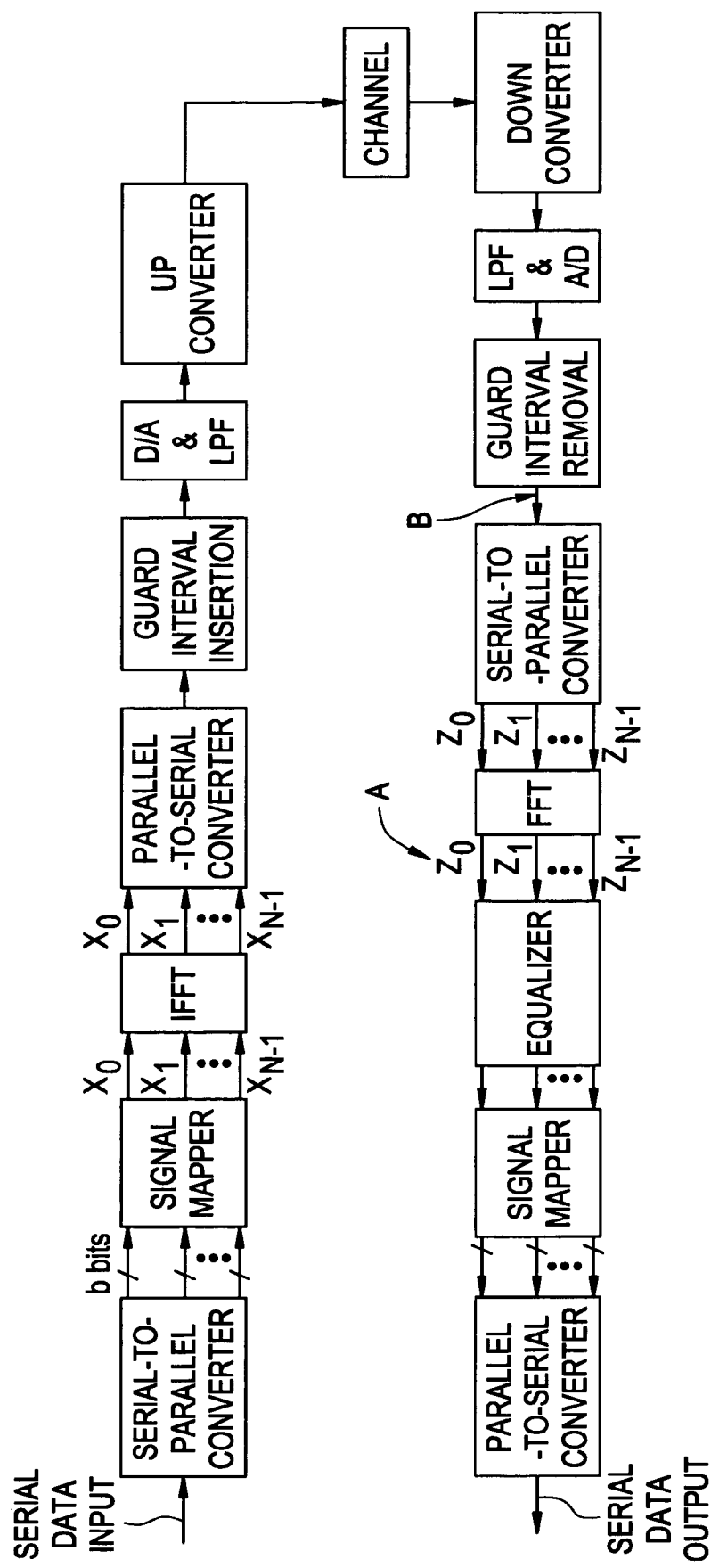
FIG. 10 illustrates a prior art reception and transmission system.
Figure 11:
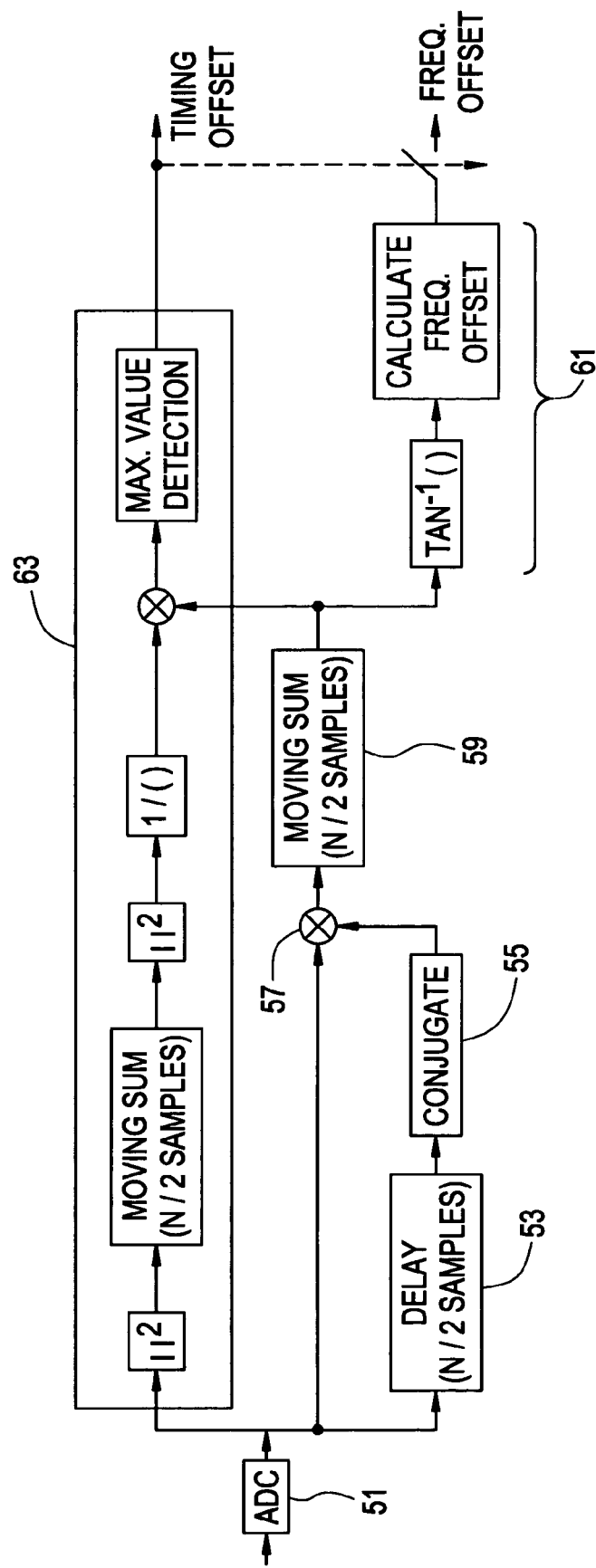
FIG. 11 illustrates a prior art fine frequency synchronization and timing estimation system.

FIGS. 7(a) and 7(b) illustrate a data structures according to the preferred embodiment of the present invention. In the first data structure illustrated in FIG. 7(a), A first training symbol R1 is provided for signal detection and gain control, and a second training symbol R2, including a guard interval G, is provided for carrying out the frequency and timing estimation according to the preferred embodiment of the present invention. A third training symbol R3 is provided for channel estimation, followed by data symbols D1, D2.

In a second data structure illustrated in FIG. 7(b), the first training symbol R1 is used for signal detection, gain control and frequency and timing synchronization. A second training symbol R2 is provided for channel estimation, followed by data symbols D1, D2.

Because the receiver keeps tracking the residual frequency offset by using prior art GIB or PB algorithm during processing of data OFDM symbols, the estimation error at the analytic tone must be less than one-half of the subcarrier spacing. However, for rapid correction of the residual frequency offset before the data symbol, the residual frequency offset is less than 0.1 of the subcarrier spacing. Therefore, considering both the estimation range and RMS error, an interval of 4 samples provides a proper estimation of the frequency offset, with a SNR greater than 10 dB in the AWGN channel.

The present invention has various advantages that overcome the prior art problems and disadvantages. For example, the present invention does not require the two-step prior art process that includes the coarse synchronization step required in the prior art frequency synchronization process. Additionally, the complex mathematical calculation required to perform frequency synchronization is replaced by the simple processing of the analytic tone, which provides the advantage of reducing the complexity of required mathematical operations. Further, the preferred embodiment of the present invention eliminates the need for a frequency offset estimation $\hat{\epsilon}$ for calculation of the timing offset estimation $\hat{\theta}$, such that the timing offset estimation $\hat{\theta}$ is calculated independently of the frequency offset estimation $\hat{\epsilon}$.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A system for estimating frequency offset in an orthogonal frequency-division multiplexing (OFDM) system, comprising:
a sliding window correlation summing device that receives an input and generates a sliding window correlation sum in accordance with a reference symbol; and
a frequency offset estimator that is coupled to said sliding window correlation summing device and receives and processes said sliding window correlation sum to calculate a frequency offset estimation, wherein said reference symbol comprises an analytic tone located in only one subchannel of said reference symbol.

2. The system of claim 1, further comprising a timing offset estimator that receives said input and generates said timing offset estimation independent of said frequency offset estimation.

3. The system of claim 2, said timing offset estimator comprising:
a first delayer that delays said input in accordance with a first interval and a second interval, and generates a first delayed output;
a second delayer that is coupled to said first delayer and delays said first delayed output in accordance with said first interval to generate a second delayed output;
a conjugator that is coupled to said second delayer and performs a first operation on said second delayed output to generate a conjugated output;
a mixer that is coupled to said conjugator and said first delayer and mixes said conjugated output and said first delayed output to generate a mixer output;
a timing offset calculator coupled to said mixer and calculating a plurality of timing offset estimations in response to said mixer output; and
a maximum value detector that is coupled to said timing offset calculator, detects a maximum value of said plurality of timing offset calculations from said timing offset calculator, and outputs said timing offset estimation.

4. The system of claim 3, wherein said first interval and said second interval have different values, said first interval is a timing offset estimation interval and said second interval is a frequency offset estimation interval.

5. The system of claim 3, wherein said timing offset calculator calculates said plurality of timing offset estimations for (N+G−a1) samples, wherein N represents a total number of subcarriers, G represents a guard interval length, and a1 represents a timing offset estimation interval.

6. The system of claim 3, wherein said timing offset estimation is calculated by selecting a maximum value for the samples for which a second operation comprising $$\left( \sum_{i=0}^{N+G-a-1} R_{n+1,a}^{(z)} \right)$$

is performed by said timing offset calculator for each of said samples.

7. The system of claim 1, said sliding window correlation sum comprising:
a first delayer that delays said input signal in accordance with a frequency offset estimation interval to generate a first delayed output;
a conjugator that performs a first operation on said first delayed output to generate a conjugated output; and
a mixer that mixes said conjugated output and said input signal to generate a mixer output.

8. The system of claim 7, wherein (N−a2) samples are generated in a moving sum in accordance with said mixer output, and N represents a total number of subcarriers and a2 represents a frequency offset estimation interval.

9. The system of claim 1, said frequency offset estimator comprising:
an analytic tone-phase compensation device that receives said sliding window correlation sum and performs a phase compensation operation to a generate a phase-compensated output; and
a frequency offset estimation calculator coupled to said analytic tone-phase compensation device and receiving said phase-compensated output and calculates said frequency offset estimation.

10. The system of claim 9, said frequency offset estimation calculator comprising:
a first calculator that performs a first operation to generate a first calculated output; and
a second calculator that receives said first calculated output and generates said frequency offset estimation.

11. The system of claim 10, wherein said first operation comprises calculating $$\tan^{-1}\left[ e^{-j\alpha\phi_b} \cdot \sum_{i=0}^{n-a-1} R_{\theta+c+i,a}^{(z)} \right]$$

and said frequency offset estimation comprises multiplying said first calculated output by N/2πa, wherein N is a number of total subcarriers and a is a number of samples.

12. The system of claim 1, further comprising a switch that outputs said frequency offset estimation in accordance with said timing offset estimation.

13. The system of claim 1, wherein an estimation range of said system can be extended by adjusting a correlation interval between samples.

14. The system of claim 1, wherein said analytic tone has at least one of a uniform magnitude and a uniform phase rotation, and no coarse synchronization is required.

15. The system of claim 1, wherein said frequency offset estimation is less than or equal to (N/2a), wherein N represents a number of subcarriers and a represents a number of samples.

16. The system of claim 15, wherein a maximum estimation range of the estimation is determined in accordance with said number of samples.

17. The system of claim 16, wherein said maximum estimation range is ±32 subcarrier spacing when N has a value equal to 1.

18. A system for estimating frequency offset in an orthogonal frequency-division multiplexing (OFDM) system, comprising:
a sliding window correlation summing device that receives an input and generates a sliding window correlation sum in accordance with a symbol;
a frequency offset estimator coupled to said sliding window correlation summing device and receiving said sliding window correlation sum and calculates a frequency offset estimation in accordance with a timing offset estimation, said frequency offset estimator comprising;

an analytic tone-phase compensation device that receives said sliding window correlation sum and performs a phase compensation operation to a generate a phase-compensated output, and a frequency offset estimation calculator that receives that said phase-compensation output and calculates said frequency offset estimation, wherein an analytic tone is used in a correlation function; and a timing offset estimator that receives said input signal and generates said timing offset estimation independent of said frequency offset estimation, wherein an estimation range can be extended by adjusting a correlation interval between samples, said analytic tone has at least one of a uniform magnitude and a uniform phase rotation, and no coarse synchronization is required.

19. A system for estimating frequency offset in an orthogonal frequency-division multiplexing (OFDM) system, comprising:

a sliding window correlation summing device that receives an input and generates a sliding window correlation sum in accordance with a reference symbol; and a frequency offset estimator that is coupled to said sliding window correlation summing device and receives said sliding window correlation sum to calculate a frequency offset estimation, wherein an analytic tone is used in a correlation function.

20. The system of claim 19, further comprising a timing offset estimator that receives said input and generates said timing offset estimation independent of said frequency offset estimation, comprising:

a first delayer that delays said input in accordance with a first interval and a second interval to generate a first delayed output;

a second delayer coupled to said first delayer and delaying said first delayed output in accordance with said first interval to generate a second delayed output;

a conjugator coupled to said second delayer and performing a calculation on said second delayed output to generate a conjugated output;

a mixer coupled to said conjugator and said first delayer and adding said conjugated output and said first delayed output to generate a sum;

a timing offset calculator coupled to said mixer and calculating a plurality of timing offset estimations in response to said sum; and a maximum value detector coupled to said timing offset calculator and selecting a maximum value from said plurality of timing offset estimators to output said timing offset estimation.

21. A method for frequency offset estimation, comprising the steps of:

(a) detecting an analytic tone located on only one subcarrier of a reference symbol of an input signal;

(b) generating a sliding window correlation sum in accordance with said analytic tone; and (c) calculating a frequency offset estimation of said sliding window correlation sum.

22. The method of claim 21, wherein a further step of generating said timing offset estimation independently of said frequency offset estimation comprises:

(a) delaying said input signal in accordance with a first interval and a second interval to generate a first delayed output;

(b) delaying said first delayed output in accordance with said first interval to generate a second delayed output;

(c) performing an operation on said second delayed output to generate a conjugated output;

(d) mixing said conjugated output and said first delayed output to generate a mixed output;

(e) producing a plurality of timing offset estimations for a corresponding plurality of samples in response to said mixed output; and (f) detecting a maximum value of said plurality of timing offset calculations to output said timing offset estimation.

23. The method of claim 22, further comprising:

(a) generating said first interval as a timing estimation interval; and (b) generating said second interval as a frequency offset estimation interval.

24. The method of claim 22, said producing step comprising producing said plurality of timing offset estimations for (N+G−a1) samples, wherein N represents a total number of subcarriers, G represents a guard interval length, and a1 represents a timing offset estimation interval.

25. The method of claim 22, wherein said detecting step comprises selecting a maximum value for the samples for which said producing step comprises performing an operation comprising $$\left( \sum_{i=0}^{N+G-a-1} R_{n+1,a}^{(z)} \right)$$

on each of said samples.

26. The method of claim 25, said step (b) comprising:

delaying said input signal in accordance with a frequency offset interval to generate a first delayed output;

performing an operation on said first delayed output to generate a conjugated output; and mixing said conjugated output and said input signal to generate a mixed output.

27. The method of claim 26, comprising generating (N−a2) samples in a moving sum in accordance with said mixed output, wherein N represents a total number of subcarriers and a2 represents a frequency offset estimation interval.

28. The method of claim 21, said calculating step comprising:

performing a phase compensation operation on said sliding window correlation sum to generate a phase-compensated output; and receiving said phase-compensated output and calculating said frequency offset estimation.

29. The method of claim 21, said calculating step comprising:

performing an operation to generate a calculated output; and receiving said calculated output and generating said frequency offset estimation.

30. The method of claim 29, wherein performing said operation comprises calculating $$\tan^{-1}\left\{ e^{-ja\phi_b} \cdot \sum_{i=0}^{n-a-1} R_{\theta+c+i,a}^{(z)} \right\}$$

and estimating said frequency offset comprises multiplying said first calculated output by N/2πa, wherein N is a number of total subcarriers and a is a number of samples.

31. The method of claim 21, further comprising extending an estimation range by adjusting a correlation interval between samples.

32. The method of claim 21, wherein said analytic tone is generated to have at least one of a uniform magnitude and a uniform phase rotation.

33. The method of claim 21, wherein said frequency offset estimation is less than or equal to (N/2a), wherein N represents a number of subcarriers and a represents a number of samples.

34. The method of claim 21, further comprising changing a maximum estimation range of the estimation in accordance with said number of samples.

35. The method of claim 34, wherein said maximum estimation range is ±32 subcarrier spacing when N equals a value of 1.

36. A method for frequency offset estimation, comprising the steps of:
 (a) detecting an analytic tone located on only one subcarrier of a reference symbol of an input signal;
 (b) generating a sliding window correlation sum in accordance with said analytic tone, said step (b) comprising, delaying said input in accordance with a frequency offset interval to generate a first delayed output,
 performing an operation on said first delayed output to generate a conjugated output, and
 mixing said conjugated output and said input signal to generate a mixed output; and
 (c) calculating a frequency offset estimation of said sliding window correlation sum in accordance with a timing offset estimation, said calculating step comprising,
 (a) performing a phase compensation operation on said sliding window correlation sum to generate a phase-compensated output,
 (b) performing a first mathematical operation to generate a first calculated output, and
 (c) receiving said first calculated output and generating said frequency offset estimation; and
 (d) extending an estimation range by adjusting a correlation interval between samples, wherein a correlation interval is adjusted such that no coarse tuning is required.

37. The method of claim 36, wherein a further step of generating said timing offset estimation independently of said frequency offset estimation comprises
 (a) delaying said input signal in accordance with a timing estimation interval and a frequency offset estimation interval to generate a first delayed output;
 (b) delaying said first delayed output in accordance with said timing estimation interval to generate a second delayed output;
 (c) performing a calculation on said second delayed output to generate a conjugated output;
 (d) adding said conjugated output and said first delayed output to generate a sum;
 (e) calculating a plurality of timing offset estimations on a corresponding plurality of samples in a timing offset calculator and in response to said sum; and
 (f) detecting a maximum value of said plurality of timing offset calculations from said timing offset calculator to output said timing offset estimation, wherein said detecting step comprises selecting a maximum value for the samples for which said calculating step comprises performing a mathematical operation comprising $$\left( \sum_{i=0}^{N+G-a-1} R_{n+1,a}^{(z)} \right)$$

on each of said samples, and said frequency offset estimator is output in accordance with said timing offset estimation.

38. The method of claim 37, wherein performing said operation comprises calculating $$\tan^{-1}\left[ e^{-j\alpha\phi_b} \cdot \sum_{i=0}^{n-a-1} R_{\wedge+c+i,a}^{(z)} \right],$$

and estimating said frequency offset comprises multiplying said first calculated output by N/2πa, wherein N is a number of total subcarriers and a is a number of samples.

39. The method of claim 36, wherein said analytic tone is generated to have at least one of a uniform magnitude and a uniform phase rotation.

40. A method for frequency offset estimation, comprising the steps of:
 (a) detecting an analytic tone of an input signal wherein said analytic tone has at least one of a uniform magnitude and a uniform phase rotation;
 (b) generating a sliding window correlation sum in accordance with said analytic tone; and
 (c) calculating a frequency offset estimation of said sliding window correlation.

* * * * *